May 17, 1960 A. ZITIN 2,937,095
FOOD PRODUCT AND METHOD OF MAKING THE SAME
Filed Aug. 26, 1958 2 Sheets-Sheet 1
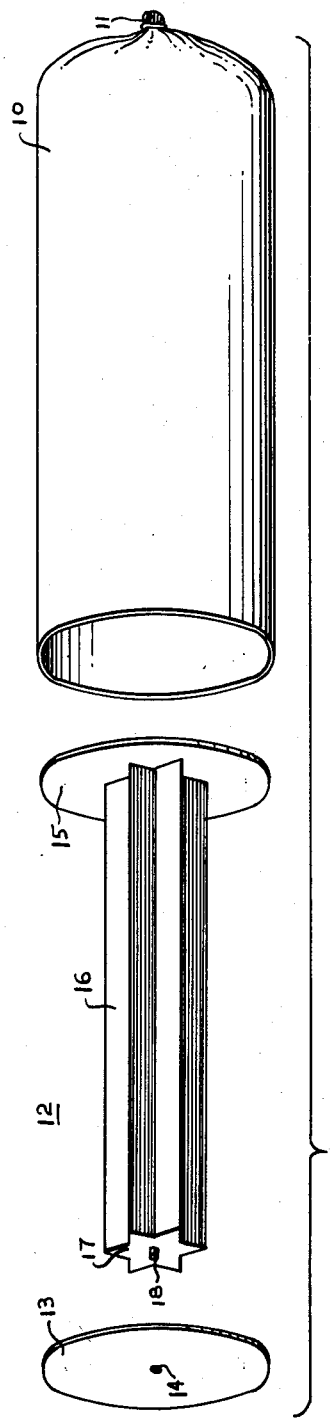
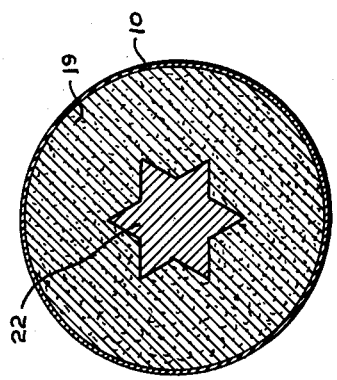
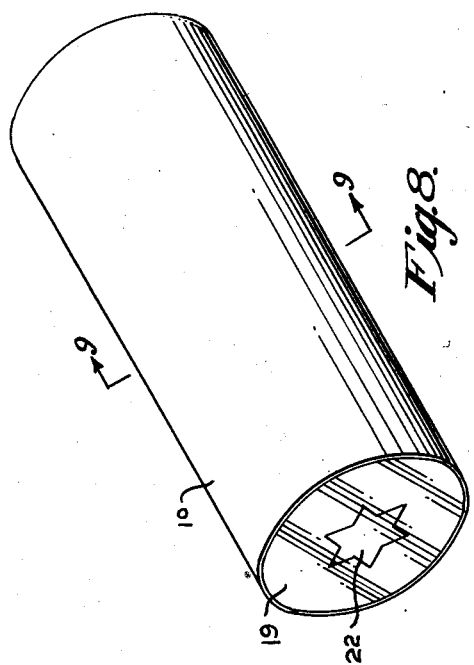
INVENTOR.
ARNOLD ZITIN
BY
ATTORNEY.

May 17, 1960  A. ZITIN  2,937,095
FOOD PRODUCT AND METHOD OF MAKING THE SAME
Filed Aug. 26, 1958  2 Sheets-Sheet 2

INVENTOR.
ARNOLD ZITIN
BY Leo Edelson
ATTORNEY.

2,937,095
FOOD PRODUCT AND METHOD OF MAKING THE SAME

Arnold Zitin, Wynnewood, Pa., assignor to Royalist Provision Company, Philadelphia, Pa., a corporation of Pennsylvania Application August 26, 1958, Serial No. 757,235

4 Claims. (Cl. 99—174)

This invention relates to the method of and apparatus for making filled meat products. More particularly, this invention relates to the method of an apparatus for making a combined meat and cheese product in which the cheese portion is completely surrounded by the meat. In the past combination meat and cheese products have been made in which meat and cheese in the final product occupy adjacent positions to each other, but heretofore the known methods and apparatus have not been capable of producing a product in which the cheese was completely surrounded by the meat. Accordingly, it is a primary object of my invention to provide a novel method of and apparatus for making a meat-surrounded cheese product.

It is another object of my invention to provide a novel method of and apparatus for making a meat-surrounded cheese product which utilizes very simple and inexpensive apparatus.

Still another object of my invention is to provide a novel method of and apparatus for making a meat-surrounded cheese product by the use of which novel designs may be made to appear when the product is viewed in cross-section, so that the displayed product presents an interesting and attractive appearance to the purchasing consumer.

These and other objects will appear more fully hereinafter from a reading of the following specification when taken in conjunction with the several figures, wherein:

Figure 1 illustrates an exploded view of the apparatus utilized in making the novel meat and cheese product.

Figures 2 through 7 illustrate the successive steps of the method employed in making the product. Figures 2 through 5 illustrate the steps associated with forming a hollow meat sheathing into which the filler will be placed. Figures 6 and 7 illustrate the filling of the meat sheathing with a cheese filler to form the final product.

Figure 8 illustrates a perspective view of the final combined meat and cheese product.

Figure 9 illustrates a cross-sectional view of the combined product of Figure 8, and is taken along the lines 9—9 of that figure.

In the several figures like elements are denoted by like reference numerals.

Figure 2:

Referring now to Figure 1, there are seen a skin or casing 10 of generally cylindrical shape which is closed at one end by a clip 11 and which is open at the opposite end. The casing 10 is of the type commonly employed for packaging lunch meat of various kinds, as for example baloney, which meats prior to being cooked are stuffed into the casing, after which the open end of the casing is closed as by tying. Immediately to the left of the casing 10 is seen a two-part mold 12 which comprises a free-end plate 13 centrally apertured as at 14, and a similar end plate 15 secured to an elongated form 16 having a closed end 17 and a centrally located stud 18 projecting from the surface of the closed end 17. The end plates 13 and 15 are seen to be of the same size and shape as the interior cross-sectional area of the casing 10, so that when they are inserted into the casing in the manner to be described the casing fits tightly about the periphery of the end plates.

It will be understood, of course that casings of shapes other than that illustrated may just as readily be employed in practicing the method to be described, and that the only modification to the apparatus which is required for such different shaped casing is that the end plates 13 and 15 shall be of the same size and shape as the casing interior when viewed in cross-section. For example, a casing of square cross-section will require the use of square cross-section end plates. Moreover, although the elongated form 16 is illustrated as being of a six-pointed star shape when viewed in cross-section, other shapes may just as readily be employed, as for example circular or square or triangular configurations. Moreover, instead of using a single elongated form such as that shown as the element 16, a plurality of spaced forms can just as readily be employed. Each of the spaced forms would of course be secured at one end to the fixed plate 15 and at the free-ends would be provided with the equivalents of the stud 18. When such a plurality of elongated forms are employed, then necessarily the free-end plate 13 would be suitably apertured to receive the plurality of studs for the purpose of holding the plurality of forms in proper position while the meat was being cooked.

Figure 3:
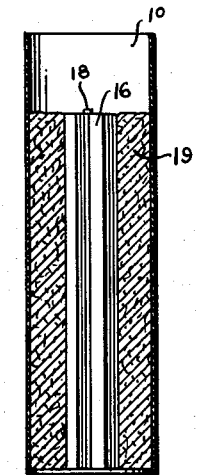
Figure 4:
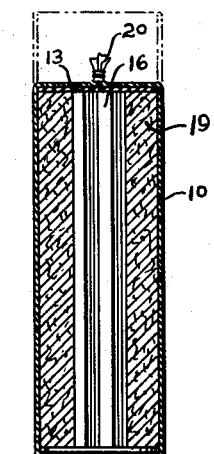

Referring now to Figures 2 through 7, in that sequence, it is seen in Figure 2 that the elongated form 16 and fixed end plate 15 have been inserted into the casing 10 so that the fixed end plate 15 abuts the closed end of the casing and the elongated form 16 is approximately centrally located within the interior of the casing 10. Referring now to Figure 3, it is seen that the casing 10 has been stuffed with meat 19, as for example uncooked baloney, which completely fills the interior of the casing on all sides of the form 16 up to the level of the closed end 17. The meat 19 may be stuffed in the casing 10 by any of the well-known methods, as for example by the use of a feed horn. Referring now to Figure 4, it is seen that after the meat 19 has been placed in the casing, the free-end plate 13 is inserted with its under side in contact with the closed end 17 of the elongated form 18 and with the meat. The end plate 13 is so placed within the casing that the stud 18 on the elongated form 16 projects through the aperture 14. The open end of the casing 10 is now pulled up tightly and tied securely as at 20, the end plate 13 preventing the elongated form 16 from changing its position within the casing.

Figure 5:
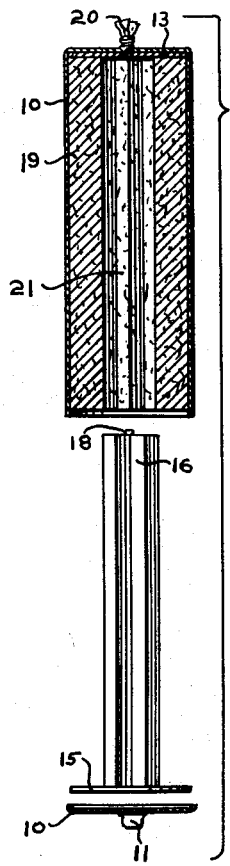

The entire casing, and hence the meat stuffed within it, is now cooked for an appropriate length of time. After the cased meat has been cooked and cooled, the clipped end of the casing 10 is slit all the way around its periphery and then removed so that the fixed end plate 15 secured to the form 16 is exposed. The fixed end plate 15 and attached form 16 are then withdrawn, thereby leaving a longitudinal star-shaped hollow opening 21 within the interior of the cased cooked meat. Figure 5 illustrates the cut away clipped end of the casing 10 and the withdrawn form 16. Withdrawal of the form 16 is readily accomplished by lubricating the surfaces thereof prior to the meat filling operation, as for example with fat or cooking oil. The end plate 13 of course remains within the casing 10.

Figure 6:
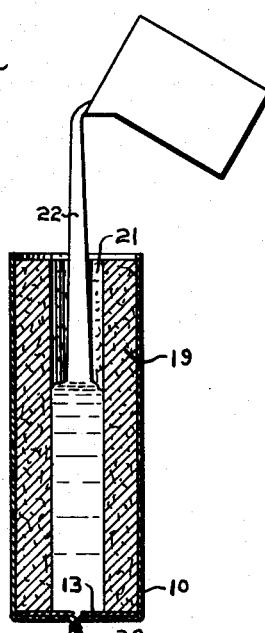
Figure 7:
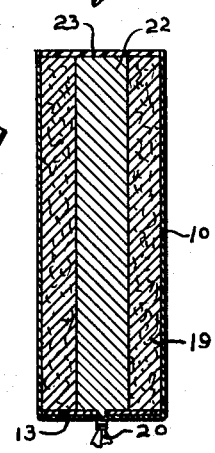

Referring now to Figure 6, it is seen that the meat filled casing 10 has been inverted so that the open end of the hollow longitudinally extending central opening 21 created by the withdrawal of the form 16 presents in an upward direction. Molten cheese, as 22, may be now poured into the opening 21 until it completely fills to the top. As shown in Figure 7 an end cap 23 is now placed over the exposed end of the combined meat and cheese product. Of course although molten cheese has been described as being filled into the opening 21, and it is contemplated that in general this is the substance which will be used, there exists no reason why this filler substance must be limited to cheese. In fact any edible substance requiring no cooking after being filled into the meat may just as readily be used.

The mold 12 may be formed from metal or plastic or any other suitable material which may be sterilized for repeated use. The end plate 13 which remains in the final meat product may also be of plastic or metal which is noncontaminating in nature. The end cap 23 may also be made of the same materials, or in the alternative may be perhaps formed of cardboard and have displayed prominently thereon attractive advertising material. If desired, the final combined meat and cheese product shown in Figure 7 may have the casing 10 peripherally slitted at the tied end 20 so that the end plate 13 may be removed, and substituted for by an end cap 23.

Although my invention has been described in connection with particularly illustrated apparatus for practicing the same, it will be understood of course, that such description is for illustrative purposes only and various changes and modifications may be made from time to time without departing from the general principles or real spirit thereof and it is intended to claim the same broadly as well as specifically as indicated by the appended claims.

What is claimed as new and useful is:

1. The method of making a hollow cooked meat product including the steps of, inserting a mold having a spacer element thereon into the interior of a tubular casing sealed at one end with said spacer element of the mold abutting the inside of the closed end of the casing in such a way that the mold end proximate the sealed end of the casing can not shift substantially laterally of the tubular casing axis, packing meat tightly into the casing around the mold, securing the nonabutting mold end so that the mold can not shift substantially relative to the tubular axis by placing a second spacer element on said non-abutting mold end within the confines of the casing, closing the open end of the tubular casing to keep the meat tightly packed, cooking the meat in the casing with the mold in place, cutting the closed end of the casing and withdrawing the mold through the cut.

2. The method of making a food product including the steps of the method of claim 1 followed by the step of completely filling the molded space in the cooked meat with an edible substance requiring no cooking after being filled into the meat.

3. The method of making a food product including the steps of the method of claim 1 followed by the steps of, pouring melted cheese into the molded opening in the cooked meat so as to completely fill it, and covering the cut in the casing to cover the exposed meat and cheese.

4. A food product prepared according to the method defined in claim 2.

References Cited in the file of this patent

UNITED STATES PATENTS

| | | |
|---|---|---|
| 1,721,406 | Parsons | July 16, 1929 |
| 1,993,621 | Parsons | Mar. 5, 1935 |
| 2,027,596 | Kurz | Jan. 14, 1936 |
| 2,186,435 | Serr | Jan. 9, 1940 |
| 2,240,522 | Serr | May 6, 1941 |
| 2,421,199 | Gutmann | May 27, 1947 |
| 2,568,491 | Edwards | Sept. 18, 1951 |
| 2,822,571 | Johnson | Feb. 11, 1958 |